(12) United States Patent
Tran et al.

(10) Patent No.: US 11,366,805 B2
(45) Date of Patent: Jun. 21, 2022

(54) INTEGRATED ENTITY VIEW ACROSS DISTRIBUTED SYSTEMS

(71) Applicant: salesforce.com, inc., San Francisco, CA (US)

(72) Inventors: Leo Duy Tran, San Francisco, CA (US); David Angulo, Boulder, CO (US); David Woodward, Westfield, IN (US); Abhinav Chadda, Emeryville (CA); David Hacker, Moraga, CA (US); Steven Ness, Victoria (CA); Matt Lagrotte, Deerfield Beach, FL (US); Jason Moody, Burlington, MA (US); Daniel Marchant, Bishop, GA (US); Matthew James Mondok, Palm Harbor, FL (US); Federico Recio, Sunny Isles Beach, FL (US); Mehmet Gokmen Orun, San Francisco, CA (US); Steven Kostrzewski, Novato, CA (US); Christopher Bill, Indianapolis, IN (US); Kaustubh Barde, San Francisco, CA (US); Lydia Lodovisi, Indianapolis, IN (US); Sarah Flamion, Newburgh, IN (US); Jamin Hall, Noblesville, IN (US); Charles Fineman, Berkeley, CA (US)

(73) Assignee: salesforce.com, inc., San Francisco, CA (US)

(*) Notice: Subject to any disclaimer, the term of this patent is extended or adjusted under 35 U.S.C. 154(b) by 153 days.

(21) Appl. No.: 16/264,470

(22) Filed: Jan. 31, 2019

(65) Prior Publication Data

US 2020/0097456 A1 Mar. 26, 2020

Related U.S. Application Data

(60) Provisional application No. 62/735,552, filed on Sep. 24, 2018.

(51) Int. Cl.
*G06F 16/242* (2019.01)
*G06F 16/28* (2019.01)
(Continued)

(52) U.S. Cl.
CPC ........ *G06F 16/2423* (2019.01); *G06F 9/542* (2013.01); *G06F 16/212* (2019.01);
(Continued)

(58) Field of Classification Search
CPC ............ G06F 16/2423; G06F 16/9035; G06F 16/24564; G06F 9/542; G06F 16/2365;
(Continued)

(56) References Cited

U.S. PATENT DOCUMENTS 7,730,478 B2 6/2010 Weissman
7,779,039 B2 8/2010 Weissman et al.
(Continued)

OTHER PUBLICATIONS

Extended European Search Report for European Application No. 19199075.3, dated Dec. 18, 2019, 9 pages.

*Primary Examiner* — William B Partridge
*Assistant Examiner* — Aryan D Toughiry
(74) *Attorney, Agent, or Firm* — Sterne, Kessler, Goldstein & Fox P.L.L.C.

(57) ABSTRACT

Methods, systems, and computer program products for a customer relationship management (CRM) system are provided herein. Embodiments presented herein provide for exchange of data between disparate, distributed systems; subscribe to and/or publish customer data change event; creation of master records for consumers using static and streaming sources; providing data provenance, auditing capabilities, and queries across multiple tenants and third party systems. Embodiments provide a single view of a customer in a distributed system environment.

20 Claims, 8 Drawing Sheets

(51) Int. Cl.
*G06F 16/23* (2019.01)
*G06F 16/215* (2019.01)
*G06F 16/2458* (2019.01)
*G06F 16/21* (2019.01)
*G06F 16/9035* (2019.01)
*G06F 16/2455* (2019.01)
*G06F 9/54* (2006.01)
*G06Q 30/00* (2012.01)

(52) U.S. Cl.
CPC ............ *G06F 16/215* (2019.01); *G06F 16/23* (2019.01); *G06F 16/2365* (2019.01); *G06F 16/2471* (2019.01); *G06F 16/24564* (2019.01); *G06F 16/288* (2019.01); *G06F 16/9035* (2019.01); *G06Q 30/01* (2013.01)

(58) Field of Classification Search
CPC .. G06F 16/2471; G06F 16/212; G06F 16/288; G06F 16/23; G06F 16/215; G06F 16/27; G06F 16/258; G06F 16/211; G06Q 30/01
See application file for complete search history.

(56) References Cited

U.S. PATENT DOCUMENTS

| | | | |
|---|---|---|---|
| 2007/0078950 A1* | 4/2007 | Hopkins | H04L 67/2804 709/217 |
| 2008/0288466 A1* | 11/2008 | Eisenberger | G16H 10/60 |
| 2009/0089169 A1 | 4/2009 | Gupta et al. | |
| 2011/0004622 A1* | 1/2011 | Marson | G06Q 10/06 707/770 |
| 2012/0277994 A1 | 11/2012 | Broome | |
| 2013/0179400 A1* | 7/2013 | Daly | G06F 16/27 707/631 |
| 2014/0324503 A1 | 10/2014 | Whittaker et al. | |
| 2016/0080334 A1 | 3/2016 | Hamilton | |
| 2018/0097880 A1 | 4/2018 | Chan et al. | |
| 2018/0189792 A1 | 7/2018 | Vaishnav et al. | |
| 2019/0012218 A1* | 1/2019 | Rimae | G06F 9/542 |
| 2019/0129981 A1* | 5/2019 | Haas | G06F 16/258 |

* cited by examiner

| Customer 360 | | | | | |
|---|---|---|---|---|---|
| Setup | Next Step: Data Mapping 502 | | | | Map Data 513 |
| Home | Great! Now that you have added data sources, the next step is to map your customer data in each to the canonical customer data model. This will allow different data sources to share information. | | | | |
| Integration Guides | | | | | |
| Data Sources | Data Sources 503 | | | | Add Data Source 511 |
| Data Mapping | All Data Sources 505 | | | | |
| > Single Customer View | 5 items Sorted by Type | | | | |
| Data Preparation 509 | Name | Type | Domain | | Production |
| Matching Rules 509 | Crocs US | Commerce Cloud | https://crocs.com | | True |
| Data Reconciliation Rules 509 | Crocs North America | Service Cloud | https://crocs-na.my.salesforce.com | | True |
| Customer Update 509 | Crocs Canada | Service Cloud | https://crocs-ca.my.salesforce.com | | True |
| Data Stewardship 509 | Crocs Latin America | Service Cloud | https://crocs-la.my.salesforce.com | | True |
| | Crocs Sales | Sales Cloud | https://crocs.my.salesforce.com | | True |
| | Crocs Marketing | Marketing Cloud | https://mc.exacttarget.com | | True |

FIG. 5

INTEGRATED ENTITY VIEW ACROSS DISTRIBUTED SYSTEMS

CROSS REFERENCE TO RELATED APPLICATIONS

This application claims the benefit of U.S. Provisional Patent Application No. 62/735,552 filed on Sep. 24, 2018, which is incorporated by reference in its entirety.

BACKGROUND

Companies have access to more data about consumers of their products and services than ever before. An objective of a CRM system is to efficiently manage and be able to easily access and share this data at all levels of service within a supply chain. However, conventional database or CRM systems are not able to integrate customer data from disparate, disconnected sources and create a master record for a consumer. Conventional systems are also challenged with determining where to get data from for either executing queries, reading, or writing data in a multi-tenant system. Another issue with conventional systems is that of data provenance, i.e., determining one or more sources of data in a record. Furthermore, conventional systems have struggled with providing audit logs for data. Data provenance and audit logs are essential for complying with privacy laws. Conventional systems also face the issue of integrating data with different time scales, accessing data from different sources, comparing the data, and reconciling it.

Typical commerce/marketing systems require administrators to produce code to convert high volume, low quality consumer data into lower volume, higher quality data. This process can be time consuming, expensive, and error prone. When a customer leaves items in an online checkout cart, i.e., abandons the cart, administrators have to write specific code to parse through large amounts of data to track such events and generate follow-up emails to the consumer. Furthermore, because data comes from disparate sources that have their own Application Programming Interface (API), conventionally administrators would have to learn the API for each system to program a query to interface with different systems and retrieve the data. Embodiments presented herein provide solutions for at least these problems amongst others.

BRIEF DESCRIPTION OF THE DRAWINGS

The accompanying drawings, which are incorporated herein and form part of the specification, illustrate the present embodiments and, together with the description, further serve to explain the principles of the present embodiments and to enable a person skilled in the relevant art(s) to make and use the present embodiments.

FIGS. 5 to 7 illustrate example user interfaces according to an embodiment of the disclosure.

Figure 1A:
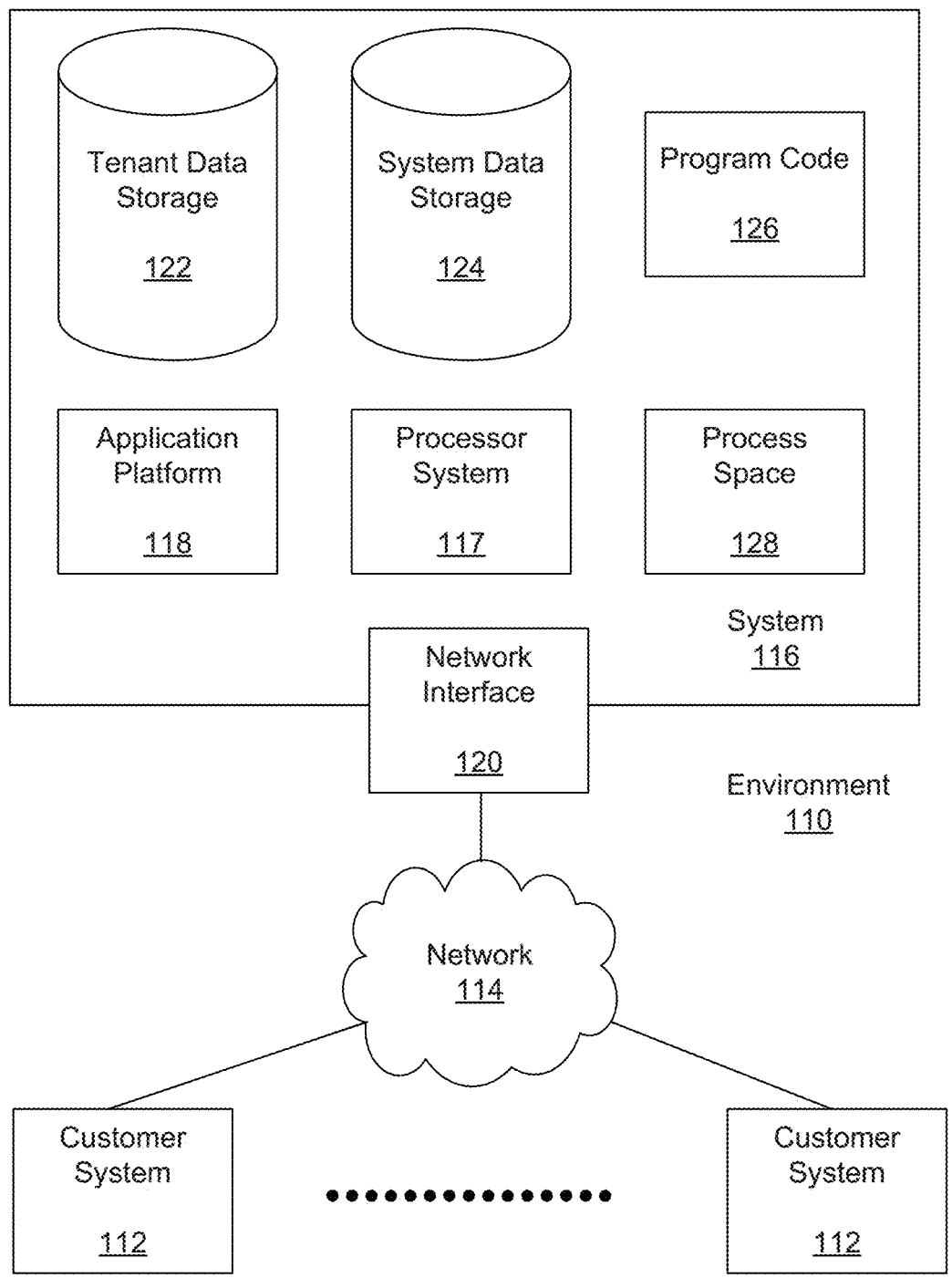
FIGS. 1A and 1B illustrate an example operating environment according to an embodiment of the disclosure.

The features and advantages of the present embodiments will become more apparent from the Detailed Description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Example Operating Environment

FIG. 1A illustrates a block diagram of an environment 110 wherein an on-demand database service might be used. The environment 110 may include customer systems 112, a network 114, a system 116, a processor system 117, an application platform 118, a network interface 120, a tenant data storage 122, a system data storage 124, program code 126, and a process space 128. In other embodiments, the environment 110 may not have all of the components listed and/or may have other elements instead of, or in addition to, those listed above. In this disclosure, a consumer may be synonymously referred to as a customer or patron.

The environment 110 is an environment in which an on-demand database service exists. A customer system 112 may be any machine or system that is used by a customer to access a database customer system. For example, any of the customer systems 112 may be a handheld computing device, a mobile phone, a laptop computer, a work station, and/or a network of computing devices. As illustrated in FIG. 1A (and in more detail in FIG. 1B) the customer systems 112 might interact via the network 114 with an on-demand database service, which is the system 116.

An on-demand database service, such as the system 116, is a database system that is made available to outside customers that do not need to necessarily be concerned with building and/or maintaining the database system, but instead may be available for their use when the customers need the database system (e.g., on the demand of the customers). Some on-demand database services may store information from one or more tenants stored into tables of a common database image to form a multi-tenant database system (MTS). Accordingly, the "on-demand database service 116" and the "system 116" will be used interchangeably herein. A database image may include one or more database objects. A relational database management system (RDMS) or the equivalent may execute storage and retrieval of information against the database object(s). The application platform 118 may be a framework that allows the applications of the system 116 to run, such as the hardware and/or software, e.g., the operating system. In an embodiment, the on-demand database service 116 may include the application platform 118 which enables creation, managing and executing one or more applications developed by the provider of the on-demand database service, customers accessing the on-demand database service via customer systems 112, or third-party application developers accessing the on-demand database service via the customer systems 112.

The users of the customer systems 112 may differ in their respective capacities, and the capacity of a particular customer system 112 might be entirely determined by permissions (permission levels) for the current user. For example, where a salesperson is using a particular customer system 112 to interact with the system 116, that customer system 112 has the capacities allotted to that salesperson. However, while an administrator is using that customer system 112 to interact with the system 116, that customer system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The customer systems 112 might communicate with the system 116 using TCP/IP and, at a higher network level, use other common Internet protocols to communicate, such as HTTP, FTP, AFS, WAP, etc. In an example where HTTP is used, the customer systems 112 might include an HTTP client commonly referred to as a "browser" for sending and receiving HTTP messages to and from an HTTP server at the system 116. Such an HTTP server might be implemented as the sole network interface between the system 116 and the network 114, but other techniques might be used as well or instead. In some implementations, the interface between the system 116 and the network 114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 116, shown in FIG. 1A, implements a web-based customer relationship management (CRM) system. For example, in one embodiment, the system 116 includes application servers configured to implement and execute CRM software applications as well as provide related data, code, forms, webpages and other information to and from the customer systems 112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, the system 116 may provide tenant access to multiple hosted (standard and custom) applications, including a CRM application. Customer (or third-party developer) applications, which may or may not include CRM, may be supported by the application platform 118, which manages creation, storage of the applications into one or more database objects, and executing of the applications in a virtual machine in the process space of the system 116.

Figure 1B:
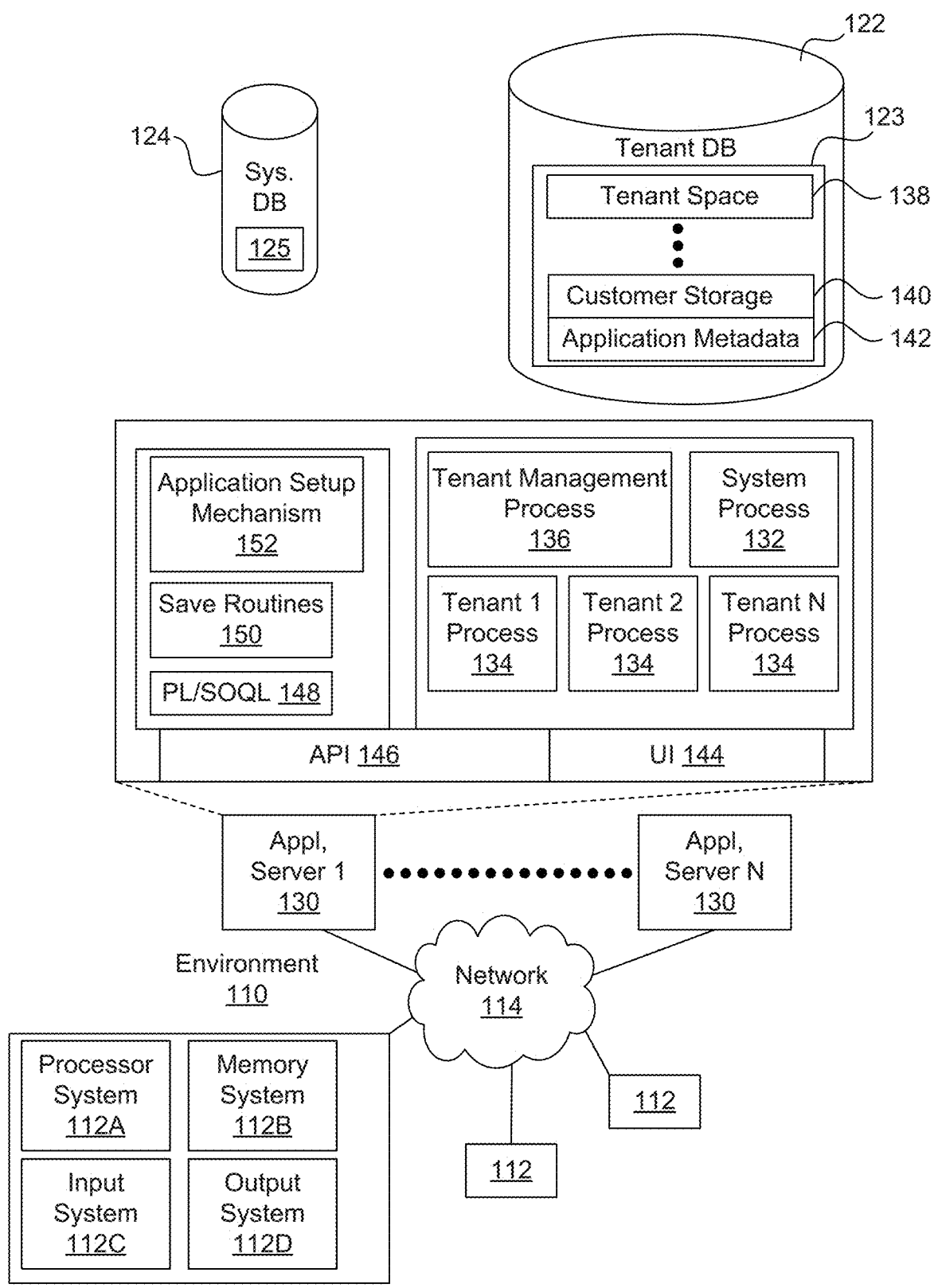

One arrangement for elements of the system 116 is shown in FIG. 1B, including the network interface 120, the application platform 118, the tenant data storage 122 for tenant data 123, the system data storage 124 for system data 125 accessible to the system 116 and possibly multiple tenants, the program code 126 for implementing various functions of the system 116, and the process space 128 for executing MTS system processes and tenant-specific processes, such as running applications as part of an application hosting service. Additional processes that may execute on the system 116 include database indexing processes.

Several elements in the system shown in FIG. 1A include conventional, well-known elements that are explained only briefly here. For example, each of the customer systems 112 could include a desktop personal computer, workstation, laptop, PDA, cell phone, or any wireless access protocol (WAP) enabled device or any other computing device capable of interfacing directly or indirectly to the Internet or other network connection. Each of the customer systems 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a customer (e.g., subscriber of the multi-tenant database system) of the customer systems 112 to access, process and view information, pages and applications available to it from the system 116 over the network 114. Each of the customer systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 116 or other systems or servers. For example, the user interface device may be used to access data and applications hosted by the system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the customer systems 112 and all of its components are operator configurable using applications, such as a browser, including computer code run using a central processing unit such as an Intel Pentium® processor or the like. Similarly, the system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 116 to intercommunicate and to process webpages, applications and other data and media content as described herein are, for example, downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 116 is configured to provide webpages, forms, applications, data and media content to the customer (client) systems 112 to support the access by the customer systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

FIG. 1B also illustrates the environment 110. However, in FIG. 1B elements of the system 116 and various interconnections in an embodiment are further illustrated. FIG. 1B shows that the each of the customer systems 112 may include a processor system 112A, a memory system 112B, an input system 112C, and an output system 112D. FIG. 1B shows the network 114 and the system 116. FIG. 1B also shows that the system 116 may include the tenant data storage 122, the tenant data 123, the system data storage 124, the system data 125, a User Interface (UI) 144, an Application Program Interface (API) 146, a PL/SOQL 148, save routines 150, an application setup mechanism 152, applications servers 130, a system process space 132, tenant process spaces 134, a tenant management process space 136, a tenant storage area 138, a customer storage 140, and application metadata 142. In other embodiments, the environment 110 may not have the same elements as those listed above and/or may have other elements instead of, or in addition to, those listed above.

The customer systems 112, the network 114, the system 116, the tenant data storage 122, and the system data storage 124 were discussed above in FIG. 1A. Regarding the customer systems 112, the processor system 112A may be any combination of one or more processors. The memory system 112B may be any combination of one or more memory devices, short term, and/or long-term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown by FIG. 1B, the system 116 may include the network interface 120 (of FIG. 1A) implemented as a set of HTTP application servers 130, the application platform 118 (of FIG. 1A), the tenant data storage 122, and the system data storage 124. Also shown is the system process space 132, including individual tenant process spaces 134 and the tenant management process space 136. Each application server 130 may be configured to access tenant data storage 122 and the tenant data 123 therein, and the system data storage 124 and the system data 125 therein to serve requests of the customer systems 112. The tenant data 123 might be divided into individual tenant storage areas 138, which may be either a physical arrangement and/or a logical arrangement of data. Within each tenant storage area 138, the customer storage 140 and the application metadata 142 might be similarly allocated for each customer. For example, a copy of a customer's most recently used (MRU) items might be stored to the customer storage 140. Similarly, a copy of MRU items for an entire organization that is a tenant might be stored to the tenant storage area 138. The UI 144 provides a user interface and the API 146 provides an application programmer interface to the system 116 resident processes to customers and/or developers at the customer systems 112. The tenant data and the system data may be stored in various databases, such as one or more databases.

The application platform 118 includes the application setup mechanism 152 that supports application developers' creation and management of applications, which may be saved as metadata into the tenant data storage 122 by the save routines 150 for execution by subscribers as one or more tenant process spaces 134 managed by the tenant management process 136 for example. Invocations to such applications may be coded using the PL/SOQL 148 that provides a programming language style interface extension to the API 146. A detailed description of some PL/SOQL language embodiments is discussed in commonly owned U.S. Pat. No. 7,730,478, filed Sep. 21, 2007, entitled, "Method and system for allowing access to developed applications via a multi-tenant on-demand database service," which is incorporated in its entirety herein for all purposes. Invocations to applications may be detected by one or more system processes, which manages retrieving the application metadata 142 for the subscriber making the invocation and executing the metadata as an application in a virtual machine.

Each application server 130 may be communicably coupled to database systems, e.g., having access to the system data 125 and the tenant data 123, via a different network connection. For example, one application server 130-1 might be coupled via the network 114 (e.g., the Internet), another application server 130-N might be coupled via a direct network link, and another application server 130-N might be coupled by yet a different network connection. Transfer Control Protocol and Internet Protocol (TCP/IP) are typical protocols for communicating between application servers 130 and the database system. However, it will be apparent to one skilled in the art that other transport protocols may be used to optimize the system depending on the network interconnect used.

In certain embodiments, each application server 130 is configured to handle requests for any user associated with any organization that is a tenant. Because it is desirable to be able to add and remove application servers from the server pool at any time for any reason, there is no server affinity for a customer and/or organization to a specific application server 130. In one embodiment, therefore, an interface system implementing a load balancing function (e.g., an F5 Big-IP load balancer) is communicably coupled between the application servers 130 and the customer systems 112 to distribute requests to the application servers 130. In one embodiment, the load balancer uses a least connections algorithm to route customer requests to the application servers 130. Other examples of load balancing algorithms, such as round robin and observed response time, also may be used. For example, in certain embodiments, three consecutive requests from the same customer could hit three different application servers 130, and three requests from different customers could hit the same application server 130. In this manner, the system 116 is multi-tenant, wherein the system 116 handles storage of, and access to, different objects, data and applications across disparate customers and organizations.

As an example of storage, one tenant might be a company that employs a sales force where each salesperson uses the system 116 to manage their sales process. Thus, a customer might maintain contact data, leads data, consumer follow-up data, performance data, goals and progress data, etc., all applicable to that customer's personal sales process (e.g., in the tenant data storage 122). In an example of a MTS arrangement, since all of the data and the applications to access, view, modify, report, transmit, calculate, etc., may be maintained and accessed by a customer system having nothing more than network access, the customer can manage his or her sales efforts and cycles from any of many different customer systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the customer systems 112 (which may be client systems) communicate with the application servers 130 to request and update system-level and tenant-level data from the system 116 that may require sending one or more queries to the tenant data storage 122 and/or the system data storage 124. The system 116 (e.g., an application server 130 in the system 116) automatically generates one or more SQL statements (e.g., one or more SQL queries) that are designed to access the desired information. The system data storage 124 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System," is hereby incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Customer, company, or client as referred to interchangeably herein refers to companies that subscribe to CRM services. For example, companies such as Crocs™ may subscribe to CRM services and are referred to as customers herein. Consumers as referred to herein refers to individuals that purchase products or services from the customers, e.g., from customer websites, customer stores, or in-person sales by the customers.

Integrated Enterprise Commerce Architecture

Figure 2:
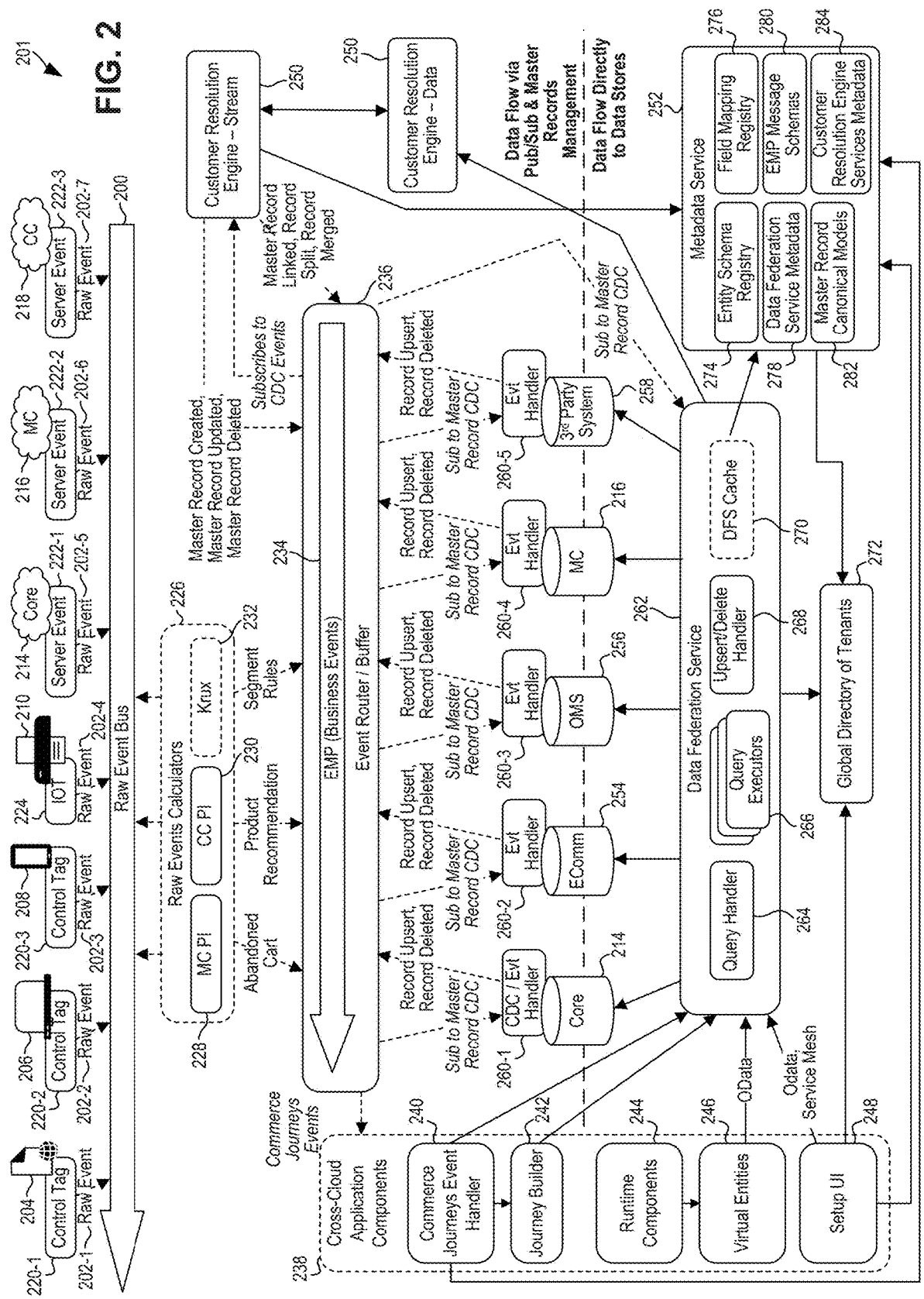
FIG. 2 illustrates an integrated enterprise commerce architecture according to an embodiment of the disclosure.

FIG. 2 illustrates an integrated enterprise commerce architecture 201 according to an embodiment of the disclosure. Architecture 201 is part of system 116 and environment 110 in FIGS. 1A-1B.

In FIG. 2, raw event bus 200 receives raw events 202-1 through 202-7 from a number of sources. For example, raw event bus 200 receives data from, including but not limited to, a customer's webpage 204 (e.g., clicks by consumers on webpage 204), from computational devices 206 (e.g., consumer laptops or desktops), mobile devices 208 (e.g., consumer smart phones and tablets), devices 210 with Internet of Things 224 (IoT) capability, core database 214, marketing cloud ("MC") 216, and commerce cloud ("CC") 218. In an example, if a customer clicks on an item on customer website 204 to view the item, a customer adds an item to an online cart, or if a customer removes an item from the online cart, a raw event of the activity is generated and associated with a control tag. Control tags 220-1 through 220-3, server events 222-1 through 222-3, and IOT 224 are used to determine which events get transmitted to the raw event bus 200. Customer and client devices can publish raw events onto the raw event bus 200 by sending the raw events to a certain Internet Protocol (IP) address such as rawevents.salesforce.com.

Raw events are typically high volume, low quality data. Embodiments presented herein convert high volume, low quality data into lower volume, higher quality data. Conventionally, administrators had to produce code to convert the high volume, low quality data into lower volume, higher quality data. The embodiments presented herein provide point-and-click software to perform this function thereby significantly reducing time and cost required for such conversions.

Raw events calculators 226 include a number of modules such as marketing cloud predictive intelligence (MC PI) 228, commerce cloud predictive intelligence (CC PI) 230, and Krux 232 for sorting raw events received via the raw event bus 200 and convert the high volume, low quality data into lower volume, higher quality data. For example, MC PI 228 parses events from the raw event bus 200 to determine what is being added by a consumer into an online checkout cart or removed from the online checkout cart. Events may include a cart identification (ID) to identify the cart. If there is an abandoned cart event, i.e., an event where a consumer adds items to a cart but doesn't checkout and complete the transaction, MC PI 228 will publish an abandoned cart event on the Enterprise Messaging Platform (EMP) bus 234. Similarly, if a cart has not seen an event such as an addition or deletion for a certain programmable period of time, then the MC PI 228 will put the event on the EMP bus 234. Raw Event Bus 200 and EMP bus 234 could be one big bus. However, Raw Event Bus 200 processes raw events, which can have high data volume and may not directly go to any customer or application, while EMP bus 234 processes business event, which can have more transactional details. Moreover, Raw Event Bus 200 can only define who has access to it or not, but EMP bus 234 has a security model that can define "who is allowed to get what events when". EMP bus 234 can provide a common abstraction layer for disparate, different customers and a common shared bus for events across different systems. Any events going onto EMP bus 234 can go to any systems encircling the platform. But different customers and different systems can't communicate directly with each other through EMP bus 234. The events on EMP bus 234 are securely isolated from each other.

EMP bus 234 allows for event publish/event subscribe rules. The event publish/event subscribe rules provide for what event can be published to the EMP bus 234 by a customer, what event can be subscribed to on the EMP bus 234 by the customer, and what happens when a customer subscribes to a particular event on the EMP bus 234. When setting up publications rules, a filter criteria can be applied for a given event to limit how it's shared, such as only publishing PersonAccounts with RecordType as "EMEA". And for a given event, the payload can be enriched with additional information before publishing to EMP bus 234. For example, RecordType information is added to a given customer data change (CDC) event so subscribers can apply filters. Similarly, when setting up subscription rules, a filter criteria can be applied when retrieving events off the share EMP 234. For example, a filter criteria can be set up to only process PersonAccount with RecordType of "NorthAmerica". EMP bus 234 can provide customer trigger events that can be used to produce an action. Taking the abandoned cart as an example, after an abandoned cart event is published on EMP bus 234, it can be subscribed to and retrieved off EMP bus 234. The abandoned cart event can be the trigger event. And an email action can be produced to remind the consumer who has abandoned the cart.

Event router/buffer 236 provides support for the event publish/event subscribe rules. The events published on EMP bus 234 are in chronological order and events exceeding a certain period of time, such as 72 hours, can be dropped off. So newly published events can push previously published events down, for example, to the left as shown in FIG. 2. Different customers can subscribe to the events on EMP bus 234 at different time point of that period of time and independently from each other. For example, as shown in FIG. 2, Core 214 can subscribe to newly published events on EMP bus 234. EComm 254 may be brought down 24 hours for system upgrade. And after EComm 254 is brought up, it can subscribe to events published 24 hours ago.

The event publish/event subscribe rules can define the schema, version, and security of the events. With different customers publish/subscribe to EMP bus, the efficiency for development life cycle can be improved by decoupling separate duties for different customers. For example, there is an update on Core 214, such as publishing new version of events. Conventionally, EComm 254, OMS 256, MC 216 and $3^{rd}$ Party system 258, which have one to one connection between each other to communicate with each other, need to be upgraded at the same time and brought up all at once to avoid system breakdown and process new version of events published by Core 214. With EMP bus 234, the systems of EComm 254, OMS 256, MC 216 and $3^{rd}$ Party system 258 can be upgraded at different time after Core 214 update, and then subscribe to the new version of events from EMP234 at different time point. Embodiments presented herein provide an easy to use point-and-click user interface (UI) for event publish/event subscribe rules that allows a customer's administrator to select what data is to be published to the EMP bus 234 and what data is to be subscribed from the EMP bus 234.

CC PI 230 provides product recommendations based on a consumer's browsing history. For example, based on items a consumer has clicked on a customer website 204, added to an online cart, or deleted from the online cart, CC PI 230, based on third party and internal data sources, can generate product recommendations. The product recommendations are placed on the EMP bus 234.

Krux 232 segments user traffic. Krux 232 has a UI that allows tracking of user clicks and segmenting the traffic into different buckets. For example, Krux 232 may segment data, based on Krux related control tags. For example, control tags may include data such as the general location where the traffic originated from, e.g., California, or whether a consumer clicked on men's or women's items. Using data from control tags 220, Krux can segment data by location, gender, age, etc. Thus, raw event calculators 226 convert the high volume, low quality data into lower volume, higher quality data and place the filtered data onto the EMP bus 234.

Cross-cloud Application Components 238 highlight the value of integrated systems by providing seamless experiences and access to data across systems. Cross-cloud Application Components 238 include commerce journeys event handler 240, journey builder 242, runtime components 244, virtual entities 246, and setup UI 248. Commerce journeys event handler 240 takes action on events filtered by raw events calculator 226 and received via the EMP bus 234. For example, commerce journeys event handler 240 monitors the EMP bus 234 for abandoned cart events and generates data for an email that reminds a consumer about items left behind in the cart that the consumer might want to purchase. Journey builder 242 builds and sends the email based on data generated by commerce journeys event handler 240.

For example, when a consumer adds an item to a shopping cart, an "add cart" event is produced on raw event bus 200. MC PI 228 starts or restarts an abandoned cart counter operation associated with the consumer's shopping cart. After a period of time passes, two days for example, MC PI 228 publishes an "abandoned cart" event on the EMP 234. Commerce journeys event handler 242 listens for "abandoned cart" events. Upon ingesting the event, commerce journeys event handler 242 requests additional information associated with the abandoned cart, such as the consumer's identity and email address, via query handler 264. Leveraging this information, journey builder 242 generates and transmits a communication to the consumer. For example, journey builder 242 may generate an email to remind the consumer of his or her interest in a product, or to offer a discount. The attributes for each journey can be defined by a user using point-and-click tools. In this regard, additional predictive logic may also be configured to determine journey attributes. For example, a calculator such as CC PI 230 may also provide information to commerce journeys event handler 240 via EMP 234, such as the amount of the discount based on the consumer's commercial value to the tenant. While conventional methods require a customer's administrator to write code to parse through raw data, determine abandoned cart events, and generate an email, the embodiments presented herein transparently provide point-and-click tools that allow the generation of such emails seamlessly and transparently. Additional commerce journey events handled by cross-cloud application components 238 may include additional commerce events, such as cart remove or add. Other events may include consumer related change events, consent events such as mailing list unsubscribe, ordering events (e.g., generating an email regarding a status of an order), and other marketing events.

Runtime Components 244 (also referred to as "retail runtime UI widgets") are a customized set of UI tools. For example, runtime components 244 include an image frame (IFrame) UI tool (not shown) that allows for integrated display and placement of a product image into, for example, a marketing email or an email that reminds a consumer of an abandoned cart. Conventionally such an extraction of a product image would require extensive coding, however the IFrame tools allows for point-and-click extraction of such images. Runtime components 244 also include a list view tool (not shown) that provides customized views of data from other systems, like commerce cloud 218 and marketing cloud 216. Virtual Entities 246 provide a common query layer for integration with third party systems. Virtual entities 246 delegates to data federation service ( ) provides a consistent interface for querying data across various systems. Thereby, data can be queried from multiple systems reducing complexity for a user seeking to access such systems.

Setup UI 248 (also referred to as "cross-cloud setup UI" herein) provides an integrated UI experience that allows a user to configure connectivity between different applications provided by the system. It also allows for users to map schemas and configure the Consumer Resolution Engine (CRE) 250. Setup UI 248 permits business users to configure different applications without needing sophisticated technical capability on the part of the user. Changes made using the setup UI 248 are saved in the Metadata Service 252 that is described further below. In an embodiment, setup UI 248 allows program developers to make their own UIs thereby providing a UI framework as a micro service to customers.

Core 214 is a database of core products and services. Core 214 includes sales cloud, service cloud, communities services, industries services, and platform services. While marketing cloud 216 and commerce cloud 218 are shown as separate clouds, in an example, marketing cloud 216 and commerce cloud 218 may be part of core 214.

E-commerce database 254 stores information used to run a storefront web interface. Order management system (OMS) 256 is a database that stores consumer order data and handles logistics after an order is placed (e.g., shipment, returns, etc.)

Third party systems 258 are databases and systems that belong to third parties such as an Enterprise Resource Planning (ERP) system. For example, a customer such as Adidas™, will have data that will be used by the embodiments herein to provide services such as event data analysis or generate marketing emails for consumers.

Event handlers 260-1 through 260-5 are associated with core, MC, OMS, e-commerce, and third party systems and are code that is used to read data from EMP bus 234 or to place data onto EMP bus 234.

Data Federation Service (DFS) 262 provides a set of connectors to plug into components of the system in order to run queries, read, write, or delete data from records. DFS 262 provide a common query interface so customers can get data from across multiple systems. For example, a customer can run a query and get data on an online cart from commerce cloud 218. Conventionally a customer would have to use a system-specific Application Programming Interface (API) for the commerce cloud 218 in order to program a query and retrieve the data. Embodiments presented herein allow the customer to forego use of the distinct APIs and provides a singular, unified API for queries across multiple disparate disconnected systems such as core 214, E-commerce database 254, OMS 256, MC 216, third party systems 258, CRE 250 etc. In DFS, the upsert/delete handler 268 allows for reading from and writing back to different systems. The DFS cache 270 stores local copies of data for performance improvement. Query executors 266 manage queries by reaching out to multiple systems for parallel execution of queries. Query handler 264 handles error scenarios resulting from queries.

By providing provide a common query interface, DFS 262 can receive a query from virtual entities 246 against a virtual schema, that is, a target shape that does not exist on disk. DFS 262 can then parse the query to be performed against a concrete logical schema. DFS 262 executes the query on the logical schema and provides the results to be returned through the target shape. Additionally, DFS 262 can perform a query that relies on a metadata model and transformation information stored in metadata service 252. Thereby, DFS 262 can rewrite a query into an ad hoc language of a downstream system using the transformation information. For example, a query may be generated that includes joins or fields. Without knowing whether a downstream system supports joins, DFS 262 can execute a query by relying on the metadata model. For example, a query may seek information associated with separate domains (e.g., an order domain and a product domain). The query may seek orders, order line items, and products information associated with the respective orders. Where a traditional query may obtain such information via separate calls to the downstream system, DFS 262 is enabled by metadata service 252 to obtain this information in a single query call.

Figure 6:
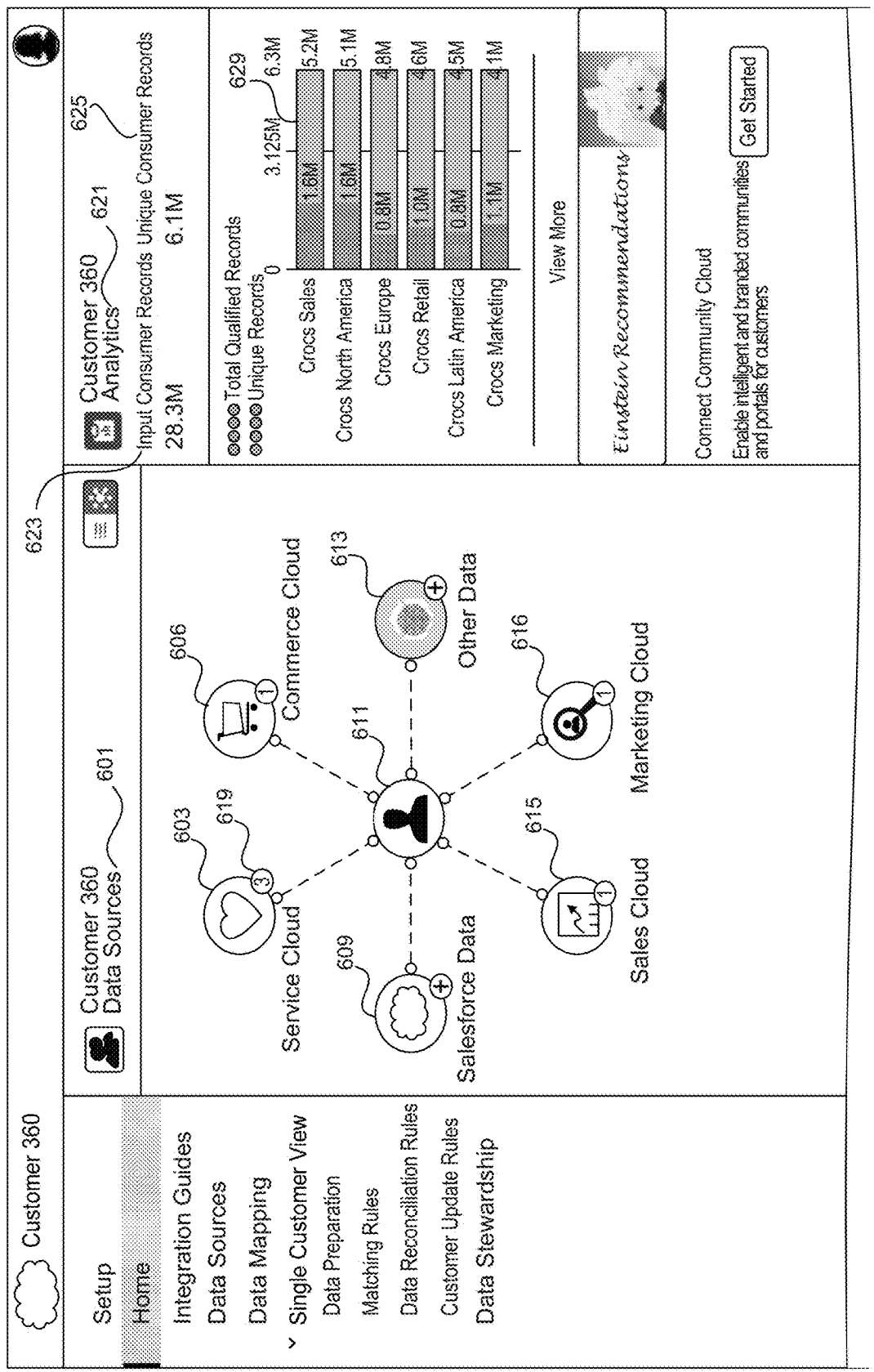

Conventional systems are challenged with determining where to get data from for either executing queries, reading, or writing data in a multi-tenant system. FIGS. 5 and 6 show examples of a multi-tenancy UI. The UI in FIG. 5 illustrates four clouds—commerce cloud, service cloud, sales cloud, and marketing cloud. Each instance of the cloud is referred to as a "tenant." For example, Crocs™ has purchased one contract for a commerce cloud ("Crocs US). Crocs' US commerce cloud is an example of a tenant. Crocs has purchased three contracts for service cloud (Crocs North America, Crocs Canada, and Crocs Latin America). The three service cloud contracts comprise three distinct tenants. Similarly, Crocs has purchased a sales cloud contract and a marketing cloud contract which comprises two distinct tenants. Global Directory of Tenants 272 provides a source for managing a customer's tenants and the authentication configuration to connect to the tenant. For example, Crocs may have a service cloud tenant for North America, Canada, and Latin America. In an embodiment, global directory of tenants 272 also manages trust relationships. For example, global directory of tenants 272 can provide for rules that allow for trust between the Crocs service clouds for North America and Canada but not Latin America. Management of trust relationships also allows for compliance with privacy laws such as General Data Protection Regulation ("GDPR"). For example, a European cloud purchased by a customer may not have a trust relationship with clouds in other regions in order to comply with European privacy laws. FIGS. 5 and 6 illustrate alternate list views of tenants. For example, the UI in FIG. 5 shows that there are three service cloud tenants, and one each of marketing cloud, sales cloud, and commerce cloud. The "other data" button and the "Salesforce data" button allows a customer to add other sources of data from non-Salesforce systems, such as their own data in an ERP system, along with Salesforce CRM data.

Metadata Service 252 provides metadata and schemas to create, edit, and store configurations for the system. Master record canonical models 282 provide a common exchange schema that reconciles the schema between disparate systems. For example, some records refer to a last name field as a "family name" instead of a "last name." Master record canonical models 282 provide a common schema for the records, e.g., family name will be resolved to "last name." Field mapping registry 276 connects different schemas. Entity schema registry 274 provides access to each tenant's specific schema. EMP message schemas 280 provide an event registry that defines the attributes of what kinds of events can go onto the EMP bus 234 and what kinds of events cannot go onto the EMP bus 234. CRE services metadata 284 determines how CRE 250 should operate. For example it determines how CRE 250 should match and normalize records. CRE 250 will be described in further detail below. DFS metadata 278 provides for what kind of data can be accessed, using queries, from the DFS 262. In an embodiment, Metadata Service 252 also provides support for versioning of schema metadata. For example, a user can create and save multiple distinct metadata profiles.

In an embodiment, query handler 264 may receive a request to perform a query across multiple data sources. For example, query handler may receive a query request for consumer data. In response, query handler 264 determines a first data source and a second data source related to the query. The first data source and second data source may be from disparate systems. Query handler 264 performs the requested query by retrieving data stored in the first data source, the second data source and a common exchange schema, such as master record canonical model 282, to reconcile the schema between the disparate first and second data sources.

Consumer Resolution Engine (CRE)

Conventional database or customer relationship management systems are not able to integrate customer data from disparate disconnected sources and create a master record for a customer without copying data to a specific system. Another issue with conventional systems is that of data provenance, i.e., determining one or more sources of data in a record. Furthermore, conventional systems have struggled with providing audit logs for data. Data provenance and audit logs are essential for complying with privacy laws. For example, if a customer wishes to edit or delete a record, they should be able to do so. CRE 250 as described herein allows for multi-tenancy, security, and regulatory compliance. Embodiments build a holistic view of the consumer, which includes not only the data but also the context surrounding the data. Sources of data include all possible touchpoints a consumer may have with a company including both current known touchpoints or future touchpoints. Touchpoints as referred to herein include, for example, point-of-sale, customer service, marketing etc. Embodiments maintain traceability of data provenance through the system to allow for searchable profiles. CRE 250 also allows for maintaining audit logs on all inputs, operations, and access of data elements. CRE 250 also allows for administrators or "data stewards" to fully control behavior of the system, monitor data quality, and modify data as needed.

Figure 7:
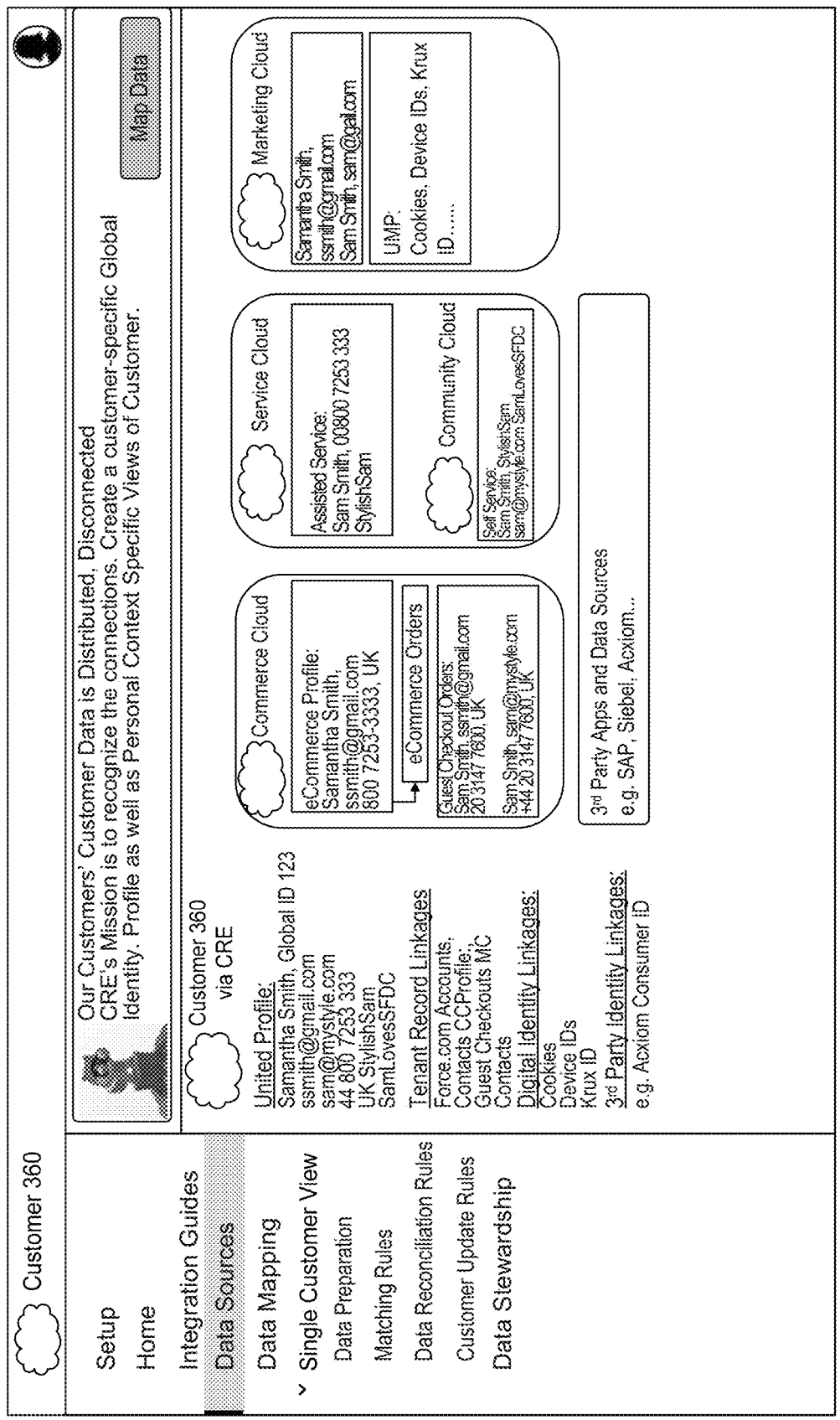

Conventional systems also face the issue of integrating data with different time scales, accessing data from different sources, comparing the data, and reconciling it. Embodiments presented herein solve these problems. CRE 250 can integrate with social media applications to gain visibility into a consumer's activities thereby providing for different consumer touchpoints. The system provides a fully integrated view of all incoming events to determine whether an event is generated by a prior consumer or a new consumer. The integrated view of a consumer allows for complete analysis of the consumer since we have reconciled data on the consumer. In contrast, conventional systems only had snippets of consumer data to work with. For example, as shown in FIG. 7, consumer Samantha Smith may purchase an item via commerce cloud, may request a service for the purchased product via service cloud, may conduct self-service via community cloud, and may be marketed further products via marketing cloud. In addition, Samantha Smith may send a Twitter message to a company's Twitter account and also use other third party applications in relation to the company. Each of these touchpoints has data on Samantha Smith, however the data is distributed and disconnected in separate systems. Furthermore, Samantha Smith may use different names, such as Sam Smith or different email addresses for the different touchpoints. As shown in FIG. 7, "Customer 360 via CRE" provides a unified view for consumer Samantha Smith by reconciling data from all the touchpoints and creating a master record for Samantha Smith. In addition, CRE provides for data provenance by keeping a record of where the data came from such as tenant record linkages, digital identity linkages, and third party identity linkages. Further details and examples of customer record reconciliation may be found in U.S. patent application Ser. No. 15/940,419, filed Mar. 29, 2018 and U.S. patent application Ser. No. 15/940,448, filed Mar. 29, 2018, both of which are incorporated by reference herein in their respective entireties.

The unified view of a consumer's reconciled data allows for analysis of the consumer's behavior for future service and marketing. For example, a customer may be tweeting a company's Twitter account, making a Facebook post related to the company, viewing a website where the company's advertisement is placed, visit the company's store, or use an Internet of Things (IOT) devices such as a washer/dryer that is linked to the company. In addition data provenance allows for determination of whether consumer data, such as an email, can be used for marketing or other purposes without triggering privacy issues.

CRE Architecture

Figure 3:
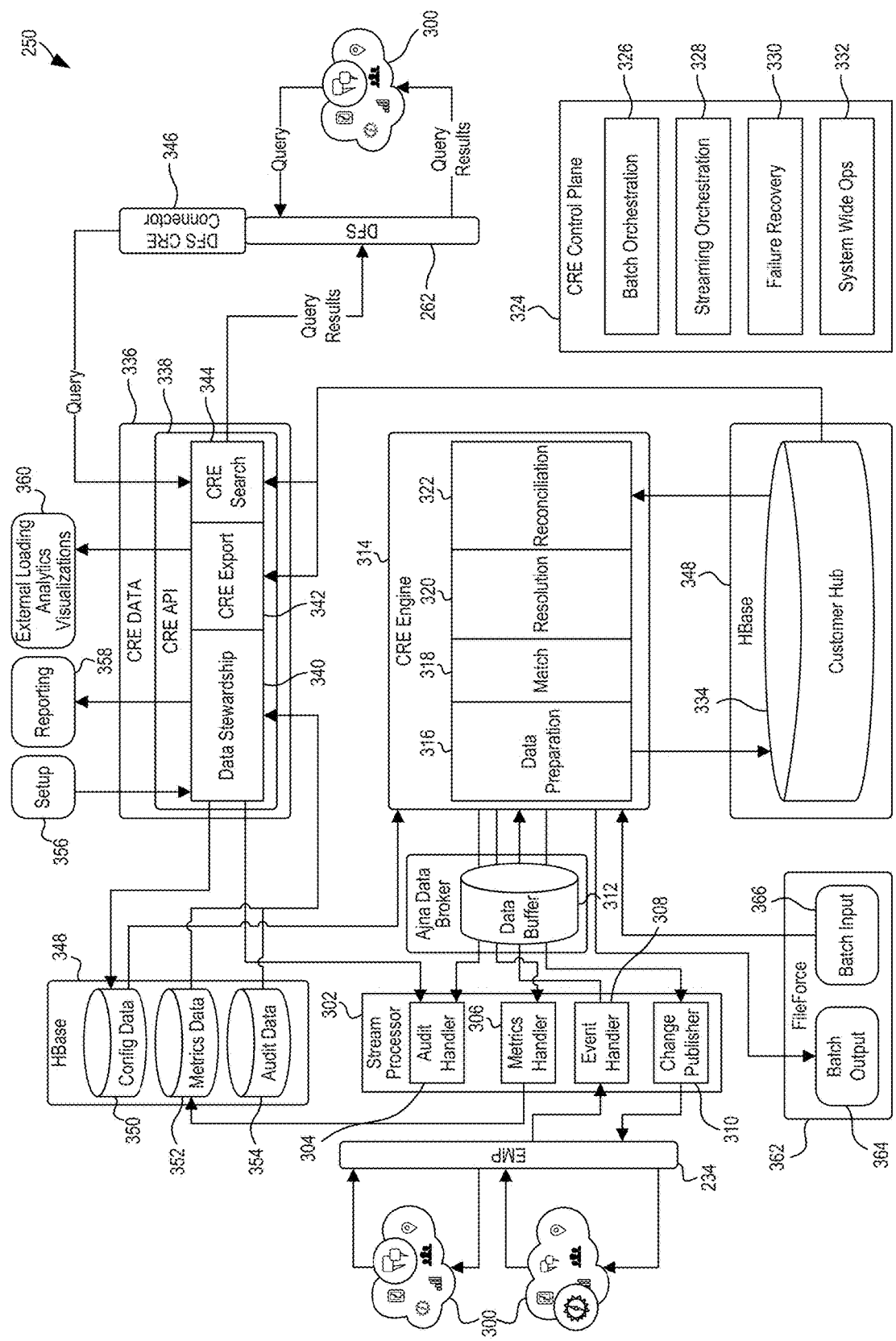
FIG. 3 illustrates a consumer resolution engine (CRE) according to an embodiment of the disclosure.

Turning to FIG. 3, data sources 300 represent data acquisition. Data sources 300 can include any data source such as commerce cloud 218, marketing cloud 216, or third party system 258. Data from data sources 300 can flow from all of the data sources into CRE 250 in real-time via an event bus.

Stream processor 302 processes streaming data streams coming in and going out. All streaming data is dealt with inside stream processor 302. Stream processor 302 includes audit handler 304 which provides data provenance and auditing capabilities. Metrics handler 306 provides operational metrics, e.g., how many new customers, how many updates etc. Event handler 308 monitors streaming data flowing in and transforms the data into canonical format. In other words, event handler 308 transforms the data structure of incoming and outgoing data to allow for processing in the correct contextual format. An example of data mapping and transformation can be found in U.S. patent application Ser. No. 16/037,435, filed Jul. 17, 2018, which is incorporated by reference herein in its entirety.

Audit handler 304 may perform an operation to determine whether to act on an update. For example, when a new event is triggered, audit handler 304 may identify and record the specific change that has occurred and decide whether to forward the update to a later stage for processing. Thereby, audit handler 304 determines whether streaming data requires additional processing based on context information associated with the streaming data. In an embodiment, audit handler 304 may transmit information associated with this determination or the context information downstream.

Transformation rules can be defined by canonical information about an event ingested by stream processor. As events reach stream processor 302 from EMP 234, context information such as the tenant or other metadata about events permits audit handler 304 to make logic decisions. Such decisions may predict information about how the data will arrive, even prior to ingesting the event. Such logic information can determine a transformation rule to be applied by stream processor 302.

In certain embodiments, data may be handled by audit handler 304 may have disparate shape or content, either when data is ingested from a single or multiple data sources. For example, stream processor 302 may ingest data having a country field, where the country field may have disparate data types or content. Audit handler 304 may make logic decisions about the data based on metadata about the tenant or other context information. A transformation rule may be applied to the data. Thus, instead of relying on external customization customer development, the metadata can be leveraged to apply proper transformation rules when data is ingested and ultimately directed to CRE engine 314.

Change publisher 310 publishes updates to a master profile of a customer onto EMP bus 234. For example, if a link or an email address is added to a profile, then the update is sent to whoever subscribes to that customer on EMP bus 234. Data buffer 312 buffers data between stream processor 302 and CRE engine 314.

CRE engine 314 includes data preparation module 316 where incoming data is normalized. For example, depending on the source of the data, addresses or phone numbers might be in the wrong format or incomplete. Data preparation module 316 also enriches the data by, for example, adding area or country code that may be missing. Match module 318 determines for each record whether there are connections to existing master profiles. For example, a person associated with a service record from service cloud can be matched to the same person associated with a guest checkout commerce record. Thus, match module 318 makes edges to connect disconnected records.

CRE engine 314 can receive and associate different consumer data records from disparate data sources related directed to an individual consumer. Match module 318 formats the consumer records received from disparate data sources into a standard format and matches the consumer data with existing records based on at least one transformation rule. Furthermore, CRE engine 314 can create a master record for the consumer in such manner, using the formatted data and existing records associated with the individual consumer.

As described above with respect to FIG. 7, different records for Samantha Smith in different sources may be connected by match module. Matching rules are configured and optimized to create a single record out of multiple records. Match module 318 uses a configurable set of criteria to determine a matching record in a canonical data model. Embodiments of UIs allow an administrator to setup and configure matching rules. The matching rules are composed of criteria and a combination of conditions that can be used for matching. Data mapping can allow an administrator to write code to resolve mismatches in field type between customer data and the canonical format.

Resolution module 320 analyzes connections between records to determine which records should be clustered. Reconciliation module 322 creates the master record using the cluster of different records. It also allows for configuration of a specific value in a master profile, e.g., the desired email address for a person. For example, the "Customer 360 via CRE" record in FIG. 7 is created by reconciliation module 322 using the other records from, e.g., commerce cloud, sales cloud, third party sources etc. Different rules for data reconciliation can be entered along with primary and secondary tiebreaker rules when there are multiple matches.

CRE control plane 324 manages the orchestration of data flows between the parts of the CRE system, as well as error handling should issues occur in a particular part of the system. Batch orchestration module 326 oversees batch processing by making sure that all files are in the correct location, processing resources are available, and provides notifications when processing is done. Streaming orchestration module 328 makes sure that the CRE 250 is listening to the right Enterprise Messaging Platform channels and publishing to the right channels. Failure recovery module 330 manages the failures in the system and may allocate resources in another data center upon failure. System wide ops module 332 starts and stops software components of the system. In an example, CRE control plane 324 may also do hardware capacity provisioning in an elastic infrastructure.

Customer hub 334 is where all the master profiles, including audit data, metrics data and record linkages are stored. Customer hub 334 also stores elements of the data that would be used for a profile, e.g., linkages or customer contact data coming in from commerce cloud or service cloud.

CRE data 336 includes CRE API 338. CRE API 338 includes data stewardship module 340. Data stewardship module 340 allows a customer or administrator to edit or delete a master record. For example, for compliance with privacy laws, like GDPR, if a consumer wants their information deleted, then data stewardship module can be used to delete the consumer's record in customer hub 334. Data stewardship module 340 also gives a user visibility to audit and metrics data. The UI for data stewardship can provide information such as whether records are still flowing in and at what rate, how many records are giving errors, and what methodology (e.g., fuzzy matching or exact match) is being used to match the records. Data stewardship module 340 also allows a customer to run queries against profiles and determine the source for the data in the profile. For example, data stewardship module 340 permits a user to manage, through a user interface, data based on a priority level for incoming requests, the type of request, and the requester amongst other fields. The user interface can display a request type, such as "privacy delete" along with notes from the requestor. Data stewardship module 340 further permits a user to merge flagged records into a single profile record. Data stewardship module 340 allows the user to perform a search of records based on data included therein.

CRE export module 342 is used for data analytics and for moving large datasets out of customer hub 334 for external use. CRE search module 344 provides synchronous access to customer hub 334. For example, CRE search module 344 allows a customer to search for a candidate list of master profiles. It also allows for real-time queries and lookup. If an administrator wants to put data from customer hub 334 onto a webpage, then CRE search module is used to run queries in order to render the webpage. CRE data 336 also provides search results to queries coming from DFS 262 via DFS CRE connector 346. As described above, DFS 262 queries across tenants and across the entire CRM system.

Hbase 348 in addition to including customer hub 334 includes configuration data 350, metrics data 352, and audit data 354. HBase may be NoSQL technology that is used as the storage layer of the customer hub. Configuration data 350 stores the rules for data preparation, match, resolution, and reconciliation as used in CRE engine 314. Metrics data 352 stores data received from metrics handler 306. Audit data 354 stores audit data.

Setup module 356 is a UI application for cloud-related services. Reporting module 358 provides operational status of the system to help customers make decisions. Reporting module 358 lets customers determine that master consumer profiles are being built the way they want them to. Reporting module 358 also provides feedback on how the system is operating. External loading analytics visualization module 360 allows a customer to export and visualize data in their preferred format, e.g., as a graph or a chart.

FileForce 362 stores files for batch output 364 and batch input 366. Batch input 366 includes all previously stored data on a customer that can be merged with streaming data from stream processor 302 by CRE engine 314. Batch output 364 is the refined customer data received from CRE engine 314. Data in batch input 366 and batch output 364 may be stored in a "csv" format.

It is to be appreciated that one of more of the software modules disclosed herein may utilize containerized software. Containerized software modules allow software from multiple developers to run on the same machine. It is to be appreciated that certain elements with the same identifying number are shown in different places in the figures for ease of illustration. These are however the same element.

Computer System Implementation

Figure 4:
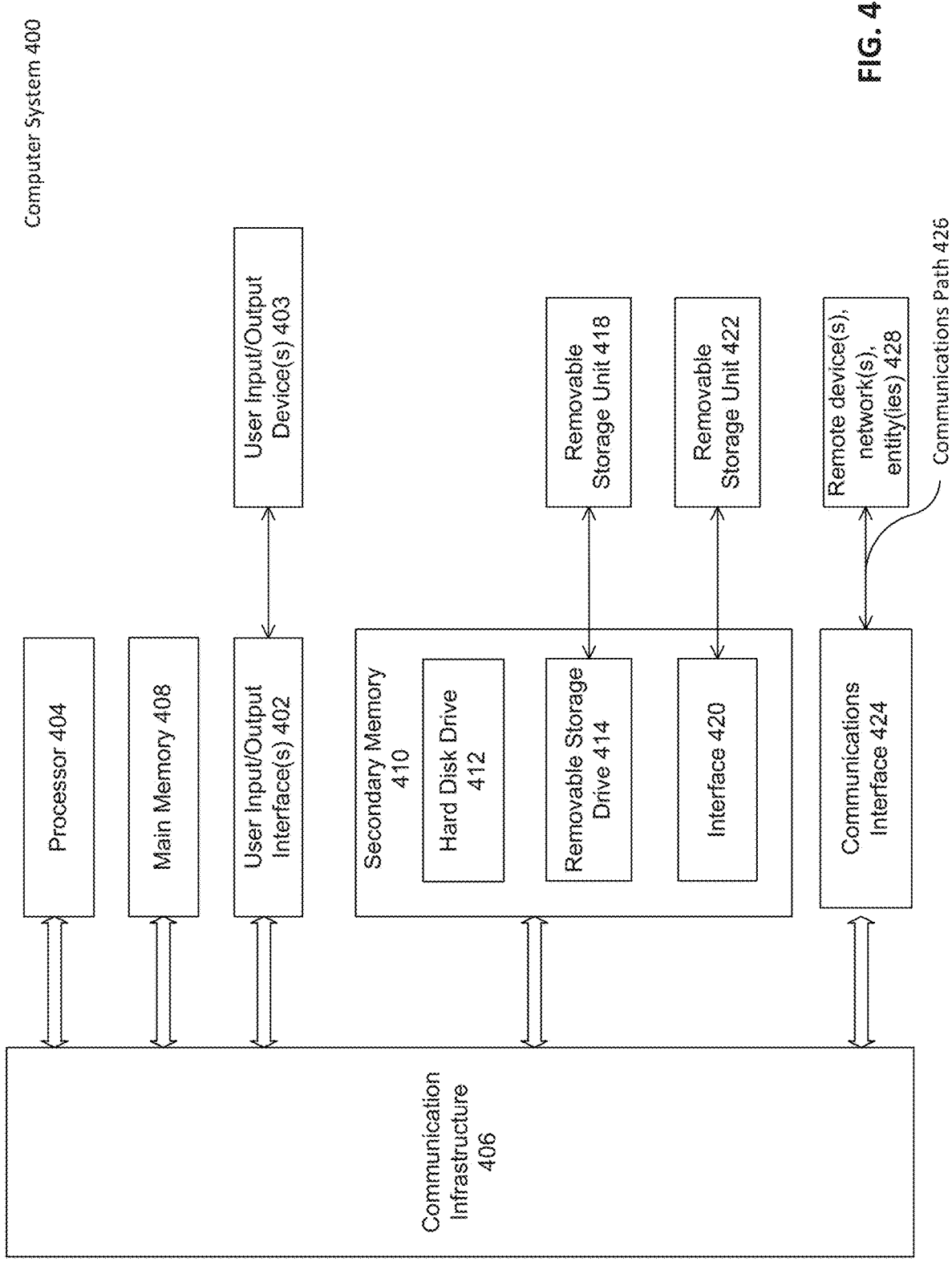
FIG. 4 illustrates an example computer system which may be used for implementing various embodiments presented herein.

Various embodiments may be implemented using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main (or primary) memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 or a removable storage device or drive 414. Removable storage drive 414 may be a floppy disk drive, a magnetic tape drive, a compact disk drive, an optical storage device, tape backup device, or any other storage device/drive.

Removable storage drive 414 may interact with a removable storage unit 418. Removable storage unit 418 may include a computer usable or readable storage device having stored thereon computer software (control logic) or data. Removable storage unit 418 may be a floppy disk, magnetic tape, compact disk, DVD, optical storage disk, or any other computer data storage device. Removable storage drive 414 may read from or write to removable storage unit 418.

Secondary memory 410 may include other means, devices, components, instrumentalities, or other approaches for allowing computer programs or other instructions or data to be accessed by computer system 400. Such means, devices, components, instrumentalities, or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 400 may further include a communications or network interface 424. Communications interface 424 may enable computer system 400 to communicate and interact with any combination of external devices, external networks, external entities, etc. (individually and collectively referenced by reference number 428). For example, communications interface 424 may allow computer system 400 to communicate with external or remote devices 428 over communications path 426, which may be wired or wireless (or a combination thereof), and which may include any combination of LANs, WANs, the Internet, etc. Control logic or data may be transmitted to and from computer system 400 via communications path 426.

Computer system 400 may also be any of a personal digital assistant (PDA), desktop workstation, laptop or notebook computer, netbook, tablet, smart phone, smart watch or other wearable, appliance, part of the Internet-of-Things, or embedded system, to name a few non-limiting examples, or any combination thereof.

Computer system 400 may be a client or server, accessing or hosting any applications or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems, or computer architectures other than that shown in FIG. 4. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an exemplary embodiment," or similar phrases, indicate that the embodiment described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected," along with their derivatives. These terms are not necessarily intended as synonyms for each other. For example, some embodiments can be described using the terms "connected" or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system, comprising:
    a memory;
    a processor coupled to the memory and configured to, based on instructions stored in the memory, perform operations comprising:
        retrieving first patron data related to a patron off a platform bus based on a first subscription rule, wherein the first subscription rule is triggered in response to publishing of the first patron data related to the patron from a first data source to the platform bus;
        retrieving second patron data related to the patron off the platform bus based on a second subscription rule, wherein the second subscription rule is triggered in response to publishing of the second patron data related to the patron from a second data source different from the first data source to the platform bus and wherein the first and second subscription rules are defined by an individual client that manages the first and second data sources;

formatting the first patron data and the second patron data into a standard format based on context information of the first patron data and the second patron data;

matching the first and second patron data with existing records related to the patron;

creating a master record for the patron using the formatted first patron data, the formatted second patron data, and the existing records, wherein the master record comprises a record of the first and second data sources for the formatted first and second patron data;

receiving, via an event bus, raw events related to the patron from a third data source, wherein the raw events are generated based on an activity of the patron on the third data source;

converting the raw events into a customer trigger event for the patron based on a predetermined rule;

generating, in response to the customer trigger event, a notification for the patron, wherein the notification is enriched with information of the patron in the master record; and sending the notification to the patron based on contact information of the patron in the master record.

2. The system according to claim 1, the operations further comprising:
transmitting a master record event in response to a change event of the master record onto the platform bus for data sources subscribed to the master record.

3. The system according to claim 1, the operations further comprising:
updating the master record for the patron using the formatted first patron data, the formatted second patron data, and the existing records.

4. The system according to claim 1, the operations further comprising:
performing a query of information associated with the patron in the master record from the first data source and the second data source through a global directory of tenants.

5. The system according to claim 1, the operations further comprising performing a commerce journey event in response to the first patron data, wherein the commerce journey event generates a notification comprising information in the master record for the patron to respond to the first patron data and sends the notification to the patron.

6. The system according to claim 1, the operations further comprising reconciling data obtained from the formatted first patron data, the formatted second patron data, and the existing records in a single view of the patron.

7. A method, comprising:
retrieving, by a computing device, first patron data related to a patron off a platform bus based on a first subscription rule, wherein the first subscription rule is triggered in response to publishing of the first patron data related to the patron from a first data source to the platform bus;

retrieving, by the computing device, second patron data related to the patron off the platform bus based on a second subscription rule, wherein the second subscription rule is triggered in response to publishing of the second patron data related to the patron from a second data source different from the first data source to the platform bus and wherein the first and second subscription rules are defined by an individual client that manages the first and second data sources;

formatting, by the computing device, the first patron data and the second patron data into a standard format based on context information of the first patron data and the second patron data;

matching, by the computing device, the first and second patron data with existing records;

creating, by the computing device, a master record for the patron using the formatted first patron data, the formatted second patron data, and the existing records, wherein the master record comprises a record of the first and second data sources for the formatted first and second patron data;

receiving, via an event bus, raw events related to the patron from a third data source, wherein the raw events are generated based on an activity of the patron on the third data source;

converting the raw events into a customer trigger event for the patron based on a predetermined rule;

generating, in response to the customer trigger event, a notification for the patron, wherein the notification is enriched with information of the patron in the master record; and sending the notification to the patron based on contact information of the patron in the master record.

8. The method according to claim 7, further comprising:
transmitting, by the computing device, a master record event in response to a change event of the master record onto the platform bus for data sources subscribed to the master record.

9. The method according to claim 7, further comprising:
updating, by the computing device, the master record for the patron using the formatted first patron data, the formatted second patron data, and the existing records.

10. The method according to claim 7, further comprising:
performing, by the computing device, a query of information associated with the patron in the master record from the first data source and the second data source accessible through a global directory of tenants.

11. The method according to claim 7, further comprising performing a commerce journey event in response to the first patron data, wherein the commerce journey event generates a notification comprising information in the master record for the patron to respond to the first patron data and sends the notification to the patron.

12. The method according to claim 7, further comprising:
reconciling, by the computing device, data obtained from the formatted first patron data, the formatted second patron data, and the existing records; and providing, by the computing device, a single view of the patron based on the reconciled data.

13. A non-transitory computer-readable apparatus having instructions stored thereon that, when executed by a computing device, cause the computing device to perform operations comprising:
retrieving, by a computing device, first patron data related to a patron off a platform bus based on a first subscription rule, wherein the first subscription rule is triggered in response to publishing of the first patron data related to the patron from a first data source to the platform bus;

retrieving, by the computing device, second patron data related to the patron off the platform bus based on a second subscription rule, wherein the second subscription rule is triggered in response to publishing of the second patron data related to the patron from a second data source different from the first data source to the platform bus and wherein the first and second subscription rules are defined by an individual client that manages the first and second data sources;

formatting, by the computing device, the first patron data and the second patron data into a standard format based on context information of the first patron data and the second patron data;

matching, by the computing device, the first and second patron data with existing records;

creating, by the computing device, a master record for the patron using the formatted first patron data, the formatted second patron data, and the existing records, wherein the master record comprises a record of the first and second data sources for the formatted first and second patron data;

receiving, via an event bus, raw events related to the patron from a third data source, wherein the raw events are generated based on an activity of the patron on the third data source;

converting the raw events into a customer trigger event for the patron based on a predetermined rule;

generating, in response to the customer trigger event, a notification for the patron, wherein the notification is enriched with information of the patron in the master record; and sending the notification to the patron based on contact information of the patron in the master record.

14. The non-transitory computer-readable apparatus of claim 13, the operations further comprising:
transmitting a master record event in response to a change event of the master record onto the platform bus for data sources subscribed to the master record.

15. The non-transitory computer-readable apparatus of claim 13, the operations further comprising:
updating the master record for the patron using the formatted first patron data, the formatted second patron data, and the existing records.

16. The non-transitory computer-readable apparatus of claim 13, the operations further comprising:
performing a query of information associated with the patron in the master record from the first data source and the second data source accessible through a global directory of tenants.

17. The non-transitory computer-readable apparatus of claim 13, the operations further comprising:
reconciling, by the computing device, data obtained from the formatted first patron data, the formatted second patron data, and the existing records; and
providing, by the computing device, a single view of the patron based on the reconciled data.

18. The system according to claim 1, wherein converting the raw events comprises:
segmenting the raw events into one or more categories; and
generating the customer trigger event for the raw events after a certain period of time.

19. The method according to claim 7, wherein converting the raw events comprises:
segmenting the raw events into one or more categories; and
generating the customer trigger event for the raw events after a certain period of time.

20. The non-transitory computer-readable apparatus of claim 13, wherein converting the raw events comprises:
segmenting the raw events into one or more categories; and
generating the customer trigger event for the raw events after a certain period of time.

* * * * *